Feb. 20, 1962
T. KENNEDY, JR
3,022,085
DETACHABLE CASING SPACER
Filed Dec. 15, 1958
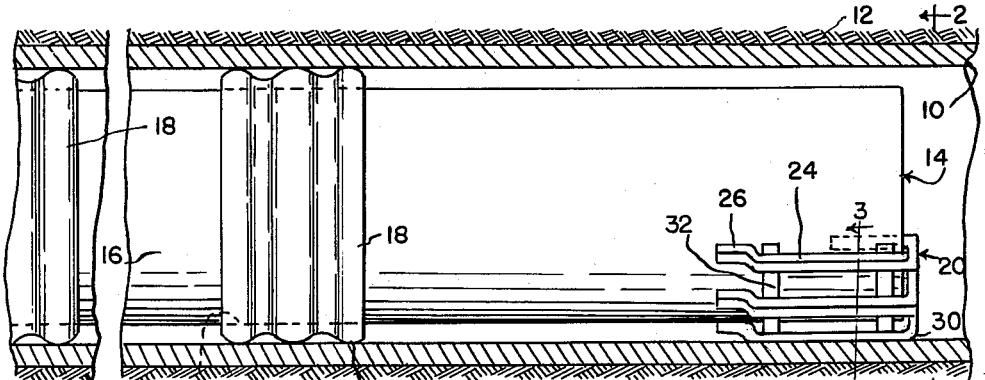
FIG.1.
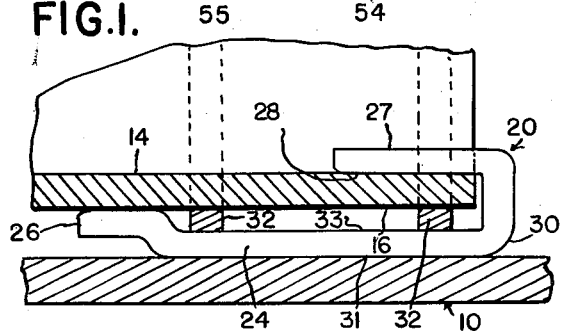
FIG.4.
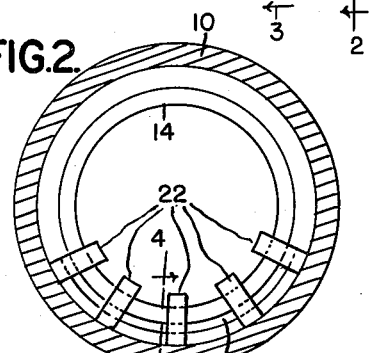
FIG.2.
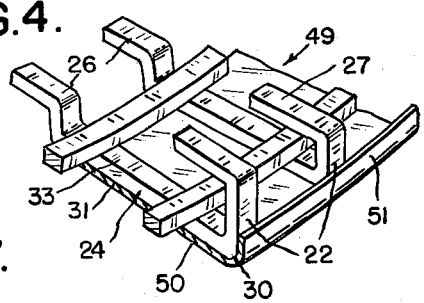
FIG.7.
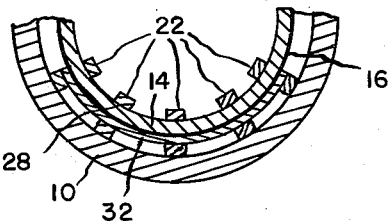
FIG.3.
FIG.8.
FIG.6.
FIG.5.
INVENTOR.
TED KENNEDY JR.
BY
Whittemore, Hulbert & Belknap
ATTORNEYS

United States Patent Office 3,022,085
Patented Feb. 20, 1962

3,022,085
DETACHABLE CASING SPACER
Ted Kennedy, Jr., 1608 Granger Ave., Ann Arbor, Mich.
Filed Dec. 15, 1958, Ser. No. 780,537
9 Claims. (Cl. 230—12)

This invention relates to underground pipes or conduits and refers more particularly to a detachable pilot spacer assembly for use on a pipe end to facilitate its passage as it is being inserted through a casing.

When an underground pipe line crosses a road, it is customary to bore a tunnel under the road and to place within the tunnel an open ended tubular casing of a size larger than the pipe line. Sections of pipe are then slid through the casing and assembled into the line.

Underground pipelines are customarily covered with a corrosion resistant coating and wrapper of one kind or another. It has been found that the act of sliding a section of pipe into a tubular casing frequently results in breaking through the coating and wrapping system. Obviously, for a coating and/or wrapper to protect a pipe against the actions of corrosion, bacteria, and the like, it is necessary to completely cover all portions of the pipe surface, and therefore, it is extremely important to avoid scraping the coating or wrapper from any portion of the pipe surface.

Fitted about the pipe in the casing are spacers which serve to provide a smooth sliding engagement with the casing and maintain a spacing between the pipe and the casing after the pipe is inserted. It is desirable to have such a spacer about the pipe end for sliding the pipe through the casing but since the pipe end in assembled position is outside of the casing, the end spacer is unnecessary and therefore becomes wasted, or valuable time and effort is spent detaching it from the pipe end.

It is therefore an essential object of this invention to provide a relatively inexpensive readily detachable runner assembly for the pipe end to aid in sliding the pipe through the casing.

Another object is to provide a detachable runner assembly insertable over a pipe end and having a longitudinal runner which has a longitudinal slot formed therein for receiving a pipe end.

Another object is to provide a detachable runner assembly insertable over a pipe end and having a plurality of connected longitudinal runners with each runner having a reversely bent forward end forming a slot for receiving the pipe end; whereby forward movement of the pipe through a casing will urge the pipe end further into the slot portions formed by the reversely bent portions of the runners, with said assembly having continuous arcuate sections welded or otherwise fixed to the inner or slot sides of the runners with said continuous arcuate sections conforming to the outer periphery of the pipe; and with the assembly being removable from the pipe with a simple forward sliding action.

Another object is to provide a readily detachable runner assembly insertable over the end of a pipe with the assembly comprising a plurality of longitudinal runners each having a pipe end receiving slot formed therein; said runners being spaced and connected by a series of separate arcuate sections with each section being welded or otherwise fixed to adjacent runners, and with the runners being spaced along a circumferential line corresponding to the pipe end circumference, whereby said connected runners can be inserted over the lower portion of the pipe circumference to provide a sliding surface over the casing as said pipe is urged through the casing and the forward movement of the pipe will urge the pipe end and the longitudinal runners into more secure engagement and the spacer assembly is quickly and simply detachable from the pipe end by means of a forward sliding action of the spacing assembly relative the pipe end for a distance sufficient to clear the pipe end from the slot in the casing spacer.

These and other objects will become more apparent when preferred embodiments of my invention are considered in connection with a drawing, in which:

FIG. 1 is a partially sectioned view of a pipe, having a detachable casing spacer inserted over one end thereof, as it is being moved through the pipe casing;
FIG. 2 is a section taken at 2—2 of FIG. 1;
FIG. 3 is a section taken at 3—3 of FIG. 1;
FIG. 4 is a section taken at 4—4 of FIG. 2;
FIG. 5 is a view similar to FIG. 3 of a second embodiment of this invention;
FIG. 6 is a view similar to FIG. 4 for the second embodiment of this invention;
FIG. 7 is a perspective view of a third embodiment; and
FIG. 8 shows the runner assembly of FIG. 6 having the plate shown in FIG. 7 applied thereto.

Referring now more particularly to the drawing, the numeral 10 indicates an open-ended tubular casing which may be formed of any suitable material. Ordinarily, the casing 10 is formed of metal. The casing is shown disposed underground, the ground being indicated at 12. Casings of this kind are usually provided under a road or railroad crossing.

The section of pipe within the casing 10 is indicated at 14. The outside diameter of the pipe 14 is sufficiently less than the inside diameter of the casing so that a clearance is formed therebetween to enable the pipe to be supported in spaced relation therewithin. The pipe may be initially coated with any suitable corrosion resistant composition and a tape 16 wrapped over it.

It will be appreciated that, when the pipe section 14 is slid endwise into the casing 10, there is danger that the pipe coating and/or wrapper 16 may be broken or otherwise impaired unless some means is provided for supporting the section of pipe in spaced relation to the casing.

As a means for supporting the pipe 14 in spaced relation within the casing, the annular casing spacers 18 are provided. Spacers are located along the length of pipe to be fitted into the casing. The spacers 18 perform the dual function of providing a low friction sliding surface with the casing 10 and providing insulated spacing between the pipe 14 and the casing 10 when the pipe has been fully inserted into the casing.

It will be appreciated that, for sliding purposes, it would be desirable to form a spacer 18 at the pipe end but after the pipe has been fully inserted in the casing such a spacer would have served its purpose and would either have to be removed, with attendant difficulties, or remain on the pipe end adding to assembly expense. This invention provides a removable runner assembly 20 which is comprised of a series of longitudinally extending runners 22 each having a running bar 24 which has one end bent inwardly to form a pipe platform 26, and an opposite end 27 bent centrally and reversely to form a pipe receiving hook or slot 28. The forward end of runner 24 is convexly rounded at 30 in order to trap therealong lubricant which would be gradually dispensed between the runner surface 31 and the casing 10 as the pipe is moved through the casing.

Connecting the individual runners 22 are two continuous arcuate sections 32 which are welded or otherwise fixed to the inner runner bar surfaces 33 and which are of a thickness substantially equal to the distance that platform 26 is raised above runner surface 24 so that the outer surface of pipe 14 will engage the inner surfaces of both sections 32 and platform 26 for a secure mounting.

In use, the platforms 26 of spacing assembly 20 are urged against an outer pipe circumference and slid along the outer surface until the pipe end enters the slot or hook 28 formed by the bent-over portion 27 of the bar 22 and abuts the runner bar end. The pipe is then inserted in the casing with the runner assembly fitted thereon, maintaining a spaced relation between the pipe end and the casing corresponding to the spacing afforded by spacers 18. The runner surfaces extend longitudinally or parallel to the pipe axis for minimum sliding resistance. The pipe with the detachable runner assembly may then be inserted in the casing 10 and slid forwardly therethrough with the runner surface 31 engaging the casing wall. The forward motion of the pipe in the casing will urge the runner assembly 20 into more secure engagement with the pipe end thereby insuring against accidental disassembly. When the pipe 14 has been fully inserted in the casing member 10, the assembly 20 may be easily removed by a simple outward pulling motion and will be immediately ready for reuse with another pipe end. With this construction there is no waste of material or labor.

In a second embodiment (FIGS. 5 and 6) runners 40 of a slightly different configuration are shown. Each runner 40 is formed of a bar 42 which has an end portion 44 bent upwardly and over to form a hook or slot 46 adapted to closely receive a pipe end. The runners 40 are spaced from each other by separate circumferential sectors 48 which are welded or otherwise fixed to adjacent runners 40.

In use, an assembly of spaced runners is inserted over a pipe end with the runner slots 46 receiving an arcuate section of the end pipe circumference. When the pipe has been fully inserted in the casing, the assembly of runners 40 may be removed by a simple pulling action to effect a sliding removal of the pipe end from the slot 46.

FIG. 7 illustrates in perspective a modification which is exactly like the structure of FIGS. 1–4 except that the runner assembly 49 there illustrated includes an arcuate plate 50 encircling or overlying the radially outer sides of the runners. The plate 50 is preferably rigidly secured to the surfaces 31 of the runners and has its front edge 51 turned radially inwardly in a curve on the same radius as surface 30 and in surface-to-surface engagement therewith. Plate 50 may alternatively be a separate member loosely assembled over the device 49. The plate 50, with its turned-up forward edge is intended to serve as a spreader for heavy lubricant to ease the passage of the runner assembly into the casing and to spread a film of lubricant to ease the passage of the spacers to follow. The plate 50 may also be applied to the runner assembly of FIGS. 5 and 6, as shown in FIG. 8. The plate may be rigidly secured to the runners 40 or simply detachably embrace the same.

In all of the embodiments, the runner assemblies are of such dimensions as to raise the leading edge of the pipe slightly higher from the bottom of the casing than the following spacers so as to remove some of the weight from the first regular spacer 18 and reduce the possibility of damage to the latter. Thus the combined radial thickness of sections 32 and runner bars 24, shown in FIG. 4, is greater than the distance between the rounded crests 54 of spacers 18 which engage the casing and the radially inner surfaces 55 of the spacers engaging the pipe. The radial thickness of the bars 42, in FIGS. 5 and 6, is also greater than the distance between the crests 54 and inner surface of spacers 18. Stated another way, when assembled on the pipe the detachable runner assemblies shown in FIGS. 1–7 project radially outwardly beyond the permanent spacers 18. The plate 50, in FIG. 7, adds a slightly greater radial dimension to the runner assembly. Hence in FIG. 1, the leading permanent spacer 18 will be lifted a very slight amount so that it will not carry the full load and is not so likely to be damaged when inserted.

What I claim as my invention is:

1. A detachable runner assembly for facilitating the endwise insertion of a pipe in a tubular casing of larger diameter than the pipe, comprising a plurality of identical runners each in the form of a bar having an elongated skid portion slidable with respect to the casing and return bent at one end to provide an open hook occupying a plane in common with said skid portion, and means rigidly interconnecting said runner bars in an arcuate series of a radius corresponding to that of the pipe with said planes of the runner bars disposed radially with respect to the arc of the series, with said hooks in arcuate alignment on the inside of the arc and opening in the same direction, and with said skid portions extending from said hooks side-by-side and in parallel relation to one another, so that said hooks may simultaneously engage an end of the pipe with said skid portions extending along the outer wall of the pipe for sliding engagement with the casing.

2. A detachable runner assembly as in claim 1 including an arcuate plate extending over the radially outer sides of said skid portions and turned radially inwardly in a smooth curve at one end to overlie the closed ends of said hooks.

3. A detachable runner assembly as in claim 1 in which said interconnecting means includes a rigid strap extending between said bars and rigidly secured to the radially inner surfaces of the skid portions of said bars, the ends of said bars opposite said hooks extending radially inwardly from said skid portions thereof to provide bearing portions having extended radially inner surfaces, the radially inner surfaces of said bearing portions and straps occupying a common cylindrical surface for bearing engagement with the outer wall of the pipe.

4. A detachable runner assembly as in claim 3 including a detachable arcuate plate extending loosely over the radially outer sides of said skid portions and turned radially inwardly in a smooth curve at one end to overlie the closed ends of said hooks.

5. A detachable runner assembly as in claim 3 including an arcuate plate fixed to said bars and extending over the radially outer sides of said skid portions and turned radially inwardly in a smooth curve at one end to overlie the closed ends of said hooks.

6. A detachable runner assembly as in claim 1 in which the radially inner surfaces of said skid portions define elements of a cylinder for full surface-to-surface engagement with the outer wall of the pipe.

7. A detachable runner assembly as in claim 6 including a detachable arcuate plate extending loosely over the radially outer sides of said skid portions and turned radially inwardly in a smooth curve at one end to overlie the closed ends of said hooks.

8. A detachable runner assembly as in claim 6 including an arcuate plate fixed to said bars and extending over the radially outer sides of said skid portions and turned radially inwardly in a smooth curve at one end to overlie the closed ends of said hooks.

9. Apparatus for use in combination with a pipe adapted to be supported in predetermined spaced relation within a casing by means including a spacer encircling an intermediate portion of said pipe, said apparatus facilitating the endwise insertion of said pipe and spacer into the casing and comprising an arcuate runner formed on a radius to correspond with that of said pipe, said runner being detachably engageable with the end of said pipe in concentric relation therewith and in longitudinally spaced relation to said spacer, said runner having a radially outer skid surface slidably engageable with the casing which skid surface projects radially outwardly from said pipe farther than said spacer to raise said end of said pipe during insertion, thereby protecting said spacer from damage, the radially outer skid surface of said runner lying in the surface of an imaginary cylinder, and an end of said runner having means providing a hook opening toward the opposite end thereof, said hook engaging and receiving said end of said pipe to effect a releasable connection therewith.

References Cited in the file of this patent
UNITED STATES PATENTS

| | | |
|---|---|---|
| 549,366 | Jones | Nov. 5, 1895 |
| 715,572 | Gregg | Dec. 9, 1902 |
| 1,971,437 | Wright | Aug. 28, 1934 |
| 2,195,530 | Curtis | Apr. 2, 1940 |
| 2,782,804 | Bond | Feb. 26, 1957 |

FOREIGN PATENTS

| | | |
|---|---|---|
| 119,153 | Austria | Sept. 25, 1930 |